US008889001B2

(12) United States Patent
Cote (10) Patent No.: US 8,889,001 B2
(45) Date of Patent: Nov. 18, 2014

(54) REVERSE OSMOSIS FOR MAPLE TREE SAP (75) Inventor: Denis Cote, Ham-Nord (CA)

(73) Assignee: Memprotec Inc., Chesterville, Quebec (CA)

( * ) Notice: Subject to any disclaimer, the term of this patent is extended or adjusted under 35 U.S.C. 154(b) by 829 days.

(21) Appl. No.: 13/044,274

(22) Filed: Mar. 9, 2011

(65) Prior Publication Data

US 2011/0220564 A1    Sep. 15, 2011

Related U.S. Application Data (60) Provisional application No. 61/282,629, filed on Mar. 9, 2010.

(51) Int. Cl.
| B01D 61/08 | (2006.01) |
| B01D 61/12 | (2006.01) |
| B01D 61/02 | (2006.01) |
| C13B 20/16 | (2011.01) |
| A01G 23/10 | (2006.01) |

(52) U.S. Cl.
CPC .............. B01D 61/025 (2013.01); B01D 61/08 (2013.01); B01D 61/12 (2013.01); C13B 20/165 (2013.01); B01D 2313/243 (2013.01); A01G 23/10 (2013.01); B01D 61/027 (2013.01); B01D 2313/18 (2013.01); B01D 2313/26 (2013.01); B01D 2317/022 (2013.01)
USPC ..... 210/195.2; 210/252; 210/258; 210/321.6; 210/341; 127/55

(58) Field of Classification Search
CPC .......... A23L 2/082; A23L 2/085; A23L 2/087
See application file for complete search history.

(56) References Cited

U.S. PATENT DOCUMENTS

| 4,997,676 | A  | * | 3/1991 | Lefebvre ........................ 427/245 |
| 6,267,894 | B1 | * | 7/2001 | Guldi et al. .................... 210/739 |
| 6,355,110 | B1 | * | 3/2002 | Donovan et al. ................ 127/55 |
| 8,137,542 | B2 | * | 3/2012 | Abe et al. ....................... 210/138 |
| 8,641,904 | B2 | * | 2/2014 | Kanaya et al. ................. 210/636 |
| 2002/0027111 | A1 | * | 3/2002 | Ando et al. .................... 210/791 |
| 2007/0023347 | A1 | * | 2/2007 | Chabot ....................... 210/321.6 |

* cited by examiner

Primary Examiner — Terry Cecil (57) ABSTRACT

A maple sap reverse osmosis system that comprises a feed pressure pump configured for receiving maple tree sap, a filter bank, at least one pressure pump operatively connected to the feed pressure pump through the filter bank, at least one recirculation pump operatively connected to the at least one pressure pump, each recirculation pump having an associated housing having an input positioned at a bottom portion of the housing, a permeate output and a concentrate output, the housing enclosing a membrane producing permeate and concentrate from the maple sap and an air inlet operatively connected to a housing in a exit position. The housings are serially connected from an entrance position housing to the exit position housing through associated inputs and concentrate outputs and wherein the housings can be completely drained of liquid through the input of the entrance position housing.

18 Claims, 9 Drawing Sheets

REVERSE OSMOSIS FOR MAPLE TREE SAP

CROSS-REFERENCE TO RELATED APPLICATIONS

This application claims the benefits of U.S. provisional patent application No. 61/282,629 filed on Mar. 9, 2010, which is herein incorporated by reference.

TECHNICAL FIELD

The present disclosure relates to a reverse osmosis system for maple tree sap.

BACKGROUND

Collecting the sap of maple trees to make maple syrup and other derivative products has been known for centuries by North-American Indians and more recently, it has been eagerly taken over by the colonists and is now a thriving industry in the North East United States and south east of Canada. Like most industry, it has to modernize in order to remain profitable and a number of inventions have automated the process.

That is why, over the years, various systems have been used to improve the production of maple syrup. The most expensive and time consuming part of the process of making maple syrup has to do with the boiling of the sap so as to create the sugary concentrate—the maple syrup.

It has been found that by using reverse osmosis, a more concentrated sap can be produced, which requires less boiling time, thus a saving in energy cost. Reverse osmosis for the purpose of filtering water has been known for decades and by discarding the pure water and keeping the concentrate, an improved process for making maple syrup was born.

However, because of their configuration, common reverse osmosis systems take a fair amount of time to drain, are subject to loss of sap during cleanup, are subject to frost because of the difficulty in completely draining the system of liquid and require great quantities of water to properly wash.

Furthermore, common reverse osmosis systems are also subject to downtime caused by the repair, maintenance and replacement of filter banks.

Accordingly, there is a need for a reverse osmosis system that addresses the above-mentioned problems.

SUMMARY

The present disclosure relates to a maple sap reverse osmosis system comprising:
 a feed pressure pump configured for receiving maple tree sap;
 a filter bank;
 at least one pressure pump operatively connected to the feed pressure pump through the filter bank;
 at least one recirculation pump operatively connected to the at least one pressure pump, each recirculation pump having an associated housing having an input positioned at a bottom portion of the housing, a permeate output and a concentrate output, the housing enclosing a membrane producing permeate and concentrate from the maple sap; and
 an air inlet operatively connected to a housing in a exit position;
wherein the housings are serially connected from an entrance position housing to the exit position housing through associated inputs and concentrate outputs and wherein the housings can be completely drained of liquid through the input of the entrance position housing.

The present disclosure also relates to a maple sap reverse osmosis system comprising:
 a feed pressure pump configured for receiving maple tree sap;
 a filter bank;
 at least one pressure pump operatively connected to the feed pressure pump through the filter bank;
 at least one recirculation pump operatively connected to the at least one pressure pump, each recirculation pump having an associated housing having an input, a permeate output and a concentrate output positioned at a bottom portion of the housing, the housing enclosing a membrane producing permeate and concentrate from the maple sap; and
 an air inlet operatively connected to a housing in an entrance position;
wherein the housings are serially connected from the entrance position housing to an exit position housing through associated inputs and concentrate outputs and wherein the housings can be completely drained of liquid through the concentrate output of the exit position housing.

The present disclosure further relates to a maple sap reverse osmosis system comprising:
 a feed pressure pump configured for receiving maple tree sap;
 a plurality of filter banks;
 a set of path selectors being configured to provide maple tree sap to selected filter banks;
 at least one pressure pump operatively connected to the feed pressure pump through the filter banks;
 at least one recirculation pump operatively connected to the at least one pressure pump, each recirculation pump having an associated housing having an input, a permeate output and a concentrate output, the housing enclosing a membrane producing permeate and concentrate from the maple sap; and
 an air inlet operatively connected to a housing in an entrance position;
wherein the housings are serially connected from the entrance position housing to an exit position housing through associated inputs and concentrate outputs.

BRIEF DESCRIPTION OF THE FIGURES

Embodiments of the disclosure will be described by way of example only with reference to the accompanying drawing, in which.

DETAILED DESCRIPTION

Generally stated, the non-limitative illustrative embodiment of the present disclosure provides a reverse osmosis system for maple tree sap with improved concentrate recuperation and draining of washing soap and permeate. In a further illustrative embodiment, the reverse osmosis system for maple tree sap is provided with redundant feed pumps and filter banks.

Although reference is made throughout the present disclosure to a reverse osmosis system using osmosis membranes, it is to be understood that the description equally applies to similar technologies such as, for example, nano-filtration membranes.

Figure 1:
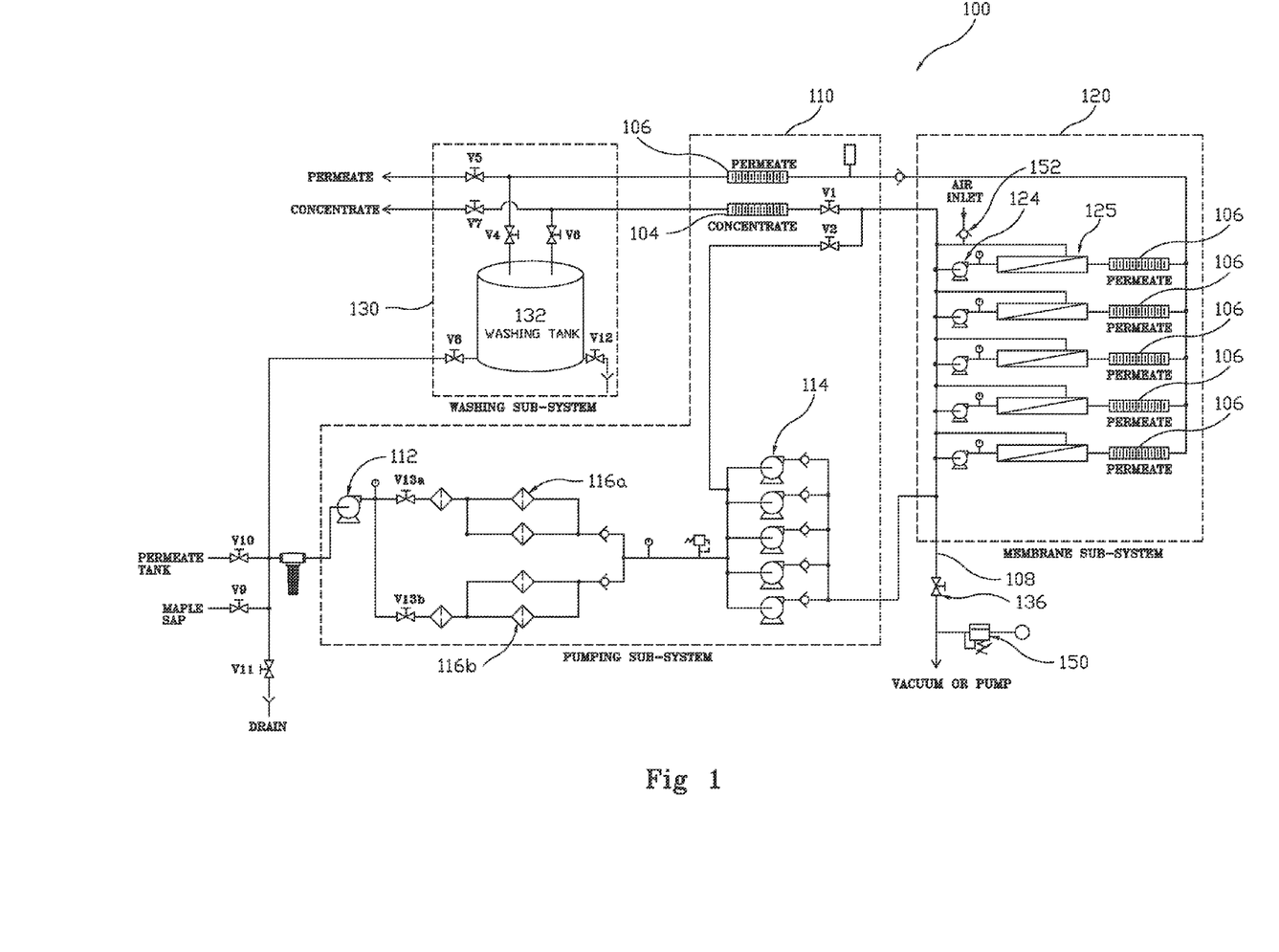
FIG. 1 is a schematic representation of the maple sap reverse osmosis system in accordance with a first illustrative embodiment of the present disclosure.

Referring to FIG. 1, there is shown a maple sap reverse osmosis system 100 in accordance with a first illustrative embodiment of the present disclosure. The reverse osmosis system 100 is generally composed of a pumping sub-system 110, a membrane sub-system 120 and a washing sub-system 130. A drain valve V11 allows the redirection of various liquids at the entry of the reverse osmosis system 100 to the drain.

The pumping sub-system 110 includes a feed pump 112, receiving maple sap from valve v9, permeate from valve v10 or washing fluid from valve v8, and a set of pressure pumps 114. Between the feed pump 112 and pressure pumps 114 are located two banks of filters 116a and 116b comprising three filters each, for example 5 micron filters.

In operation, a single filter bank 116a or 116b is used, for example filter bank 116a, while the other filter bank, i.e. filter bank 116b, is on standby in case of a failure or for maintenance to one or more filter of first filter bank 116a.

The selection of which filter bank 116a or 116b is in use may be done manually or the pumping sub-system 110 may further include controllers, actuators and sensors so as to detect failures in one or more filter and provide automatic switching between the filter banks 116a and 116b by selectively activating valves V13a and V13b. This redundancy of the filter banks 116a, 116b limits costly system downtime, for example normal clogging of the filters alone may require maintenance three to four times a day. Furthermore, an alarm or display may inform an operator previous to a complete stop (for example by detecting a psi variation) that one or more filter of a filter bank requires repairs, maintenance or replacement due to, for example, clogging of the filters. This feature is quite useful as it allows an operator to change a filter bank without having to stop the entire system 100 which may require the shutting down of as many as 15 different motors which then have to be restarted again after the filter bank is replaced.

It is to be understood that the number of filter banks, as well as the number of filters per bank, may vary.

The membrane sub-system 120 includes a set of housings 125, each having therein an osmosis membrane, with associated recirculation pumps 124 and a check-valve air inlet 152. The housings 125 and their interconnections will be further detailed below.

It is to be understood that the number of housings 125 and recirculation pumps 124 may vary.

The washing sub-system 130 includes a washing tank 132, a set of redirection valves V4, V5, V6, V7 and V8, and a drainage valve V12. The redirection valves V4, V5, V6 and V7 allow the redirection of concentrate 104 and permeate 106 from the membrane sub-system 120 to respective holding tanks (not shown), the redirection of permeate 106 from the permeate holding tank into the washing tank 132 to be mixed with a cleaning agent to form a washing solution and the redirection of the washing solution, through valve V8, into the internal components of the membrane sub-system 120.

Although not shown, it is to be understood that the reverse osmosis system 100 also includes all the electronics and electrical components necessary for its operation. Also, flow meter gauges providing visual indications of the permeate and concentrate may also be included.

Figure 2:
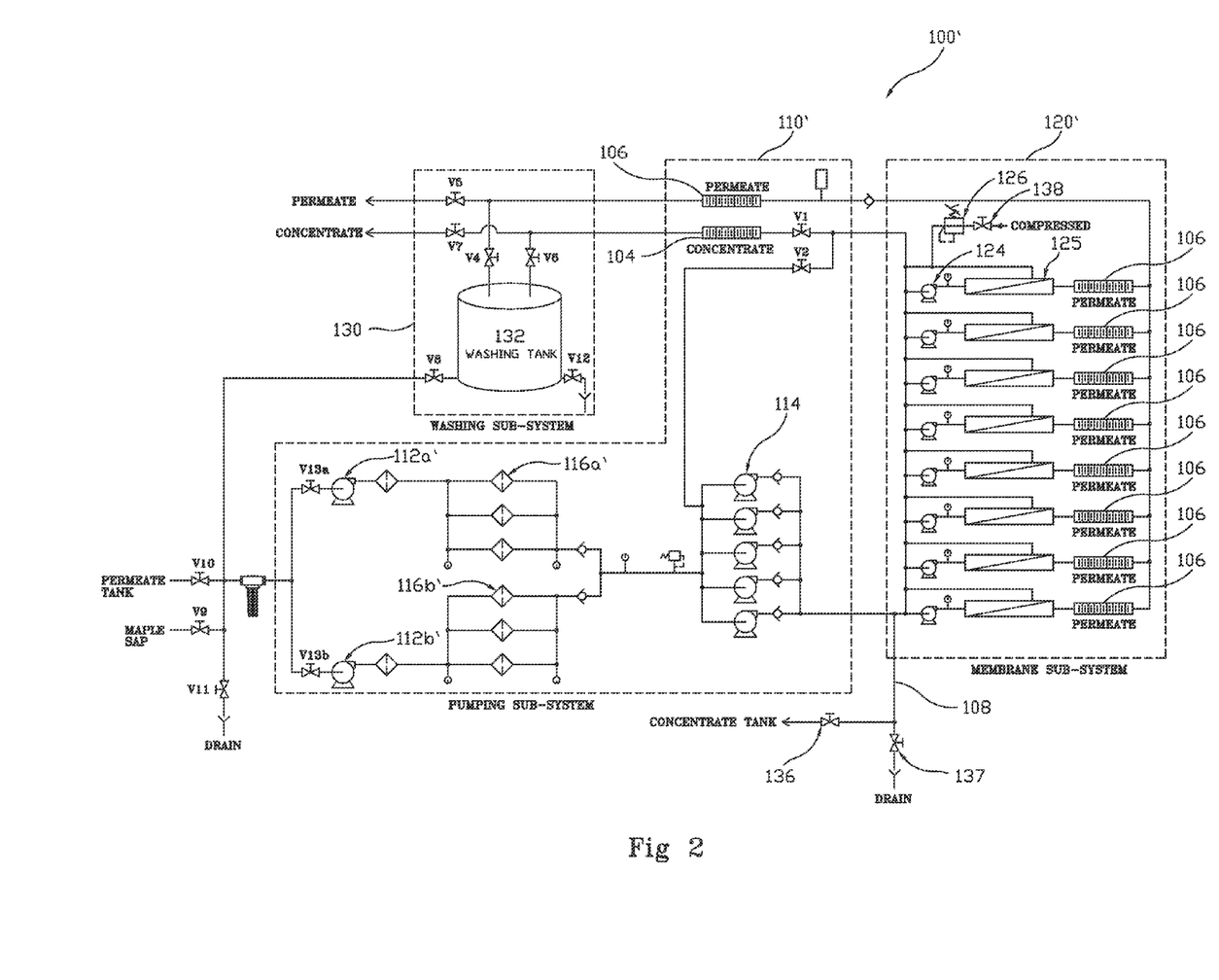
FIG. 2 is a schematic representation of the maple sap reverse osmosis system in accordance with a second illustrative embodiment of the present disclosure.

Referring to FIG. 2, there is shown a maple sap reverse osmosis system 100' in accordance with a second illustrative embodiment of the present disclosure. The reverse osmosis system 100' is generally composed of a pumping sub-system 110', a membrane sub-system 120' and a washing sub-system 130.

In this illustrative embodiment, the pumping sub-system 110' includes two sets of feed pumps and filter banks, a first set comprising feed pump 112'a and filter bank 116'a, and a second set comprising feed pump 112'b and filter bank 116'b. The filter banks 116'a and 116'b comprise four filters each, for example 5 micron filters.

In operation a single set of feed pumps and filters is used, for example feed pump 112'a and filter bank 116'a, while the other set, feed pump 112'b and filter bank 116'b, is on standby in case of a failure or for maintenance to one or more components of the first set, i.e. feed pump and/or filter.

Again, the selection of which set of feed pump and filters may be done manually or the pumping sub-system 110' may also include controllers, actuators and sensors so as to detect failures in one or more component of a feed pump and filter bank set and provide automatic switching to between sets by selectively activating valves V13a and V13b. This redundancy of the feed pumps 112'a, 112'b and filter banks 116'a, 116'b limits costly system downtime. Furthermore, an alarm or display may inform an operator before a complete halt of the system 100 that one or more feed pump and/or filter of a filter bank requires repairs, maintenance or replacement due to, for example, clogging of the filters.

It is to be understood that the number of sets of feed pumps and filter banks, as well as the number of feed pumps and filters per set, may vary.

The membrane sub-system 120' includes a set of housings 125, each having therein an osmosis membrane, with associated recirculation pumps 124, and a pressure regulator 126 with associated compressed air inlet 138. The housings 125 and their interconnections will be further detailed below.

It is to be understood that the number of housings 125 and recirculation pumps 124 may vary.

In this embodiment, the washing sub-system 130 is as described in FIG. 1.

Figure 3:
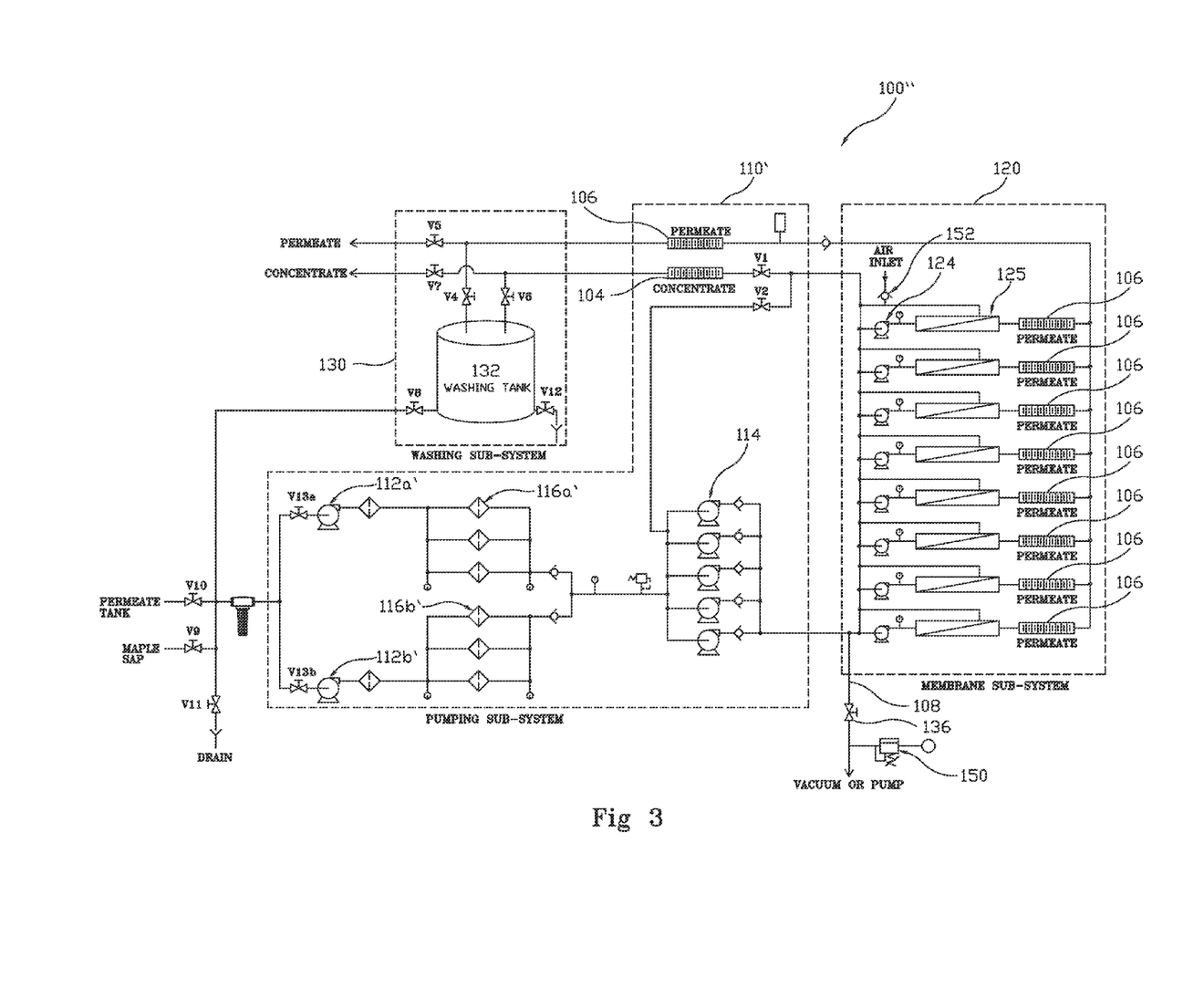
FIG. 3 is a schematic representation of the maple sap reverse osmosis system in accordance with a third illustrative embodiment of the present disclosure.

It is to be understood that the pumping, membrane and washing sub-systems may be combined in various configurations. For instance, FIG. 3 shows a maple sap reverse osmosis system 100" in accordance with a third illustrative embodiment of the present disclosure in which the pumping sub-system 110' of FIG. 2 is combined with the membrane 120 and washing 130 sub-systems of FIG. 1. In a further alternative embodiment (not shown), a maple sap reverse osmosis system may combine the membrane sub-system 120' of FIG. 2 with the pumping 110 and washing 130 sub-systems of FIG. 1.

It is also to be understood that the other alternative embodiments may include one of the described sub-systems with commonly used sub-systems.

Figure 4:
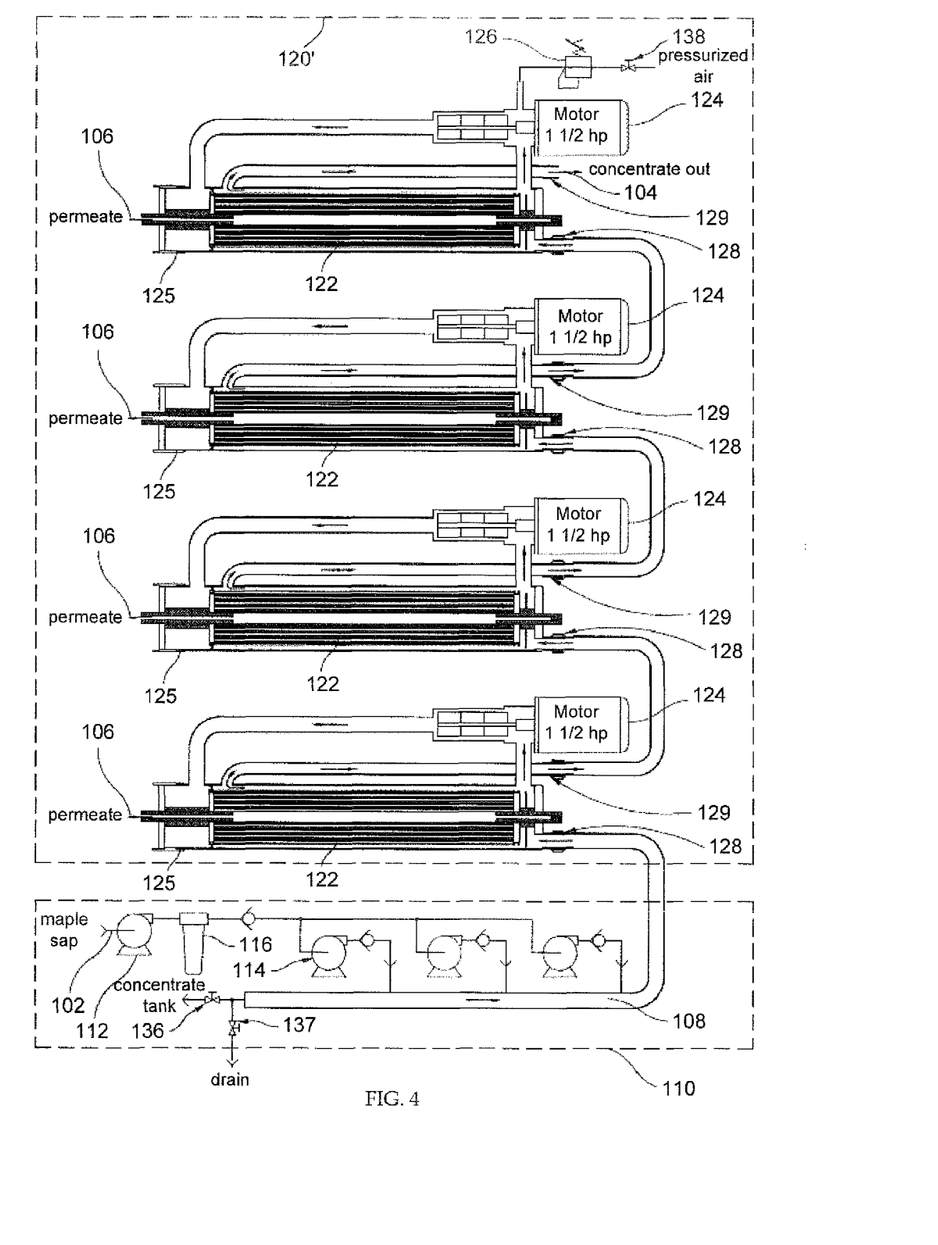
FIG. 4 is detailed view of a first example of a membrane sub-system in accordance with an illustrative embodiment of the present disclosure.

Referring now to FIG. 4, there is shown a first detailed example of a membrane sub-system 120' in accordance with the general configuration of the membrane sub-system 120' of FIG. 2. In this example, the membrane sub-system 120' is provided with a set of four housings 125 with associated recirculation pumps 124. Each housing 125 includes therein an osmosis membrane 122, for example with a capacity of 600 GPH at 500 psi.

The pumping sub-system 110 provides maple sap to the membrane sub-system 120' through conduit 108 which is connected to the input 128 of the bottommost housing 125 at position BA. The intermediary housings 125, at positions IA, are interconnected by their respective outputs 129 and inputs 128. The output 129 of the topmost housing 125, at position TA, provides the concentrate 104.

It should be noted that the input 128 of each housing 125 is placed at the bottom, which facilitates the draining of the housing 125. However, the draining valve 137 being located at the lowest point of the system 100', a few inches from the ground, and the concentrate holding tank being usually elevated with respect to the draining valve 137, complicate the task of recuperating expensive concentrate still in the various housings 125. Accordingly, the draining may be accomplished by injecting compressed air through the compressed air inlet 138 of the topmost housing 125 (position TA), the remaining maple sap being forced by the compressed air and gravity in a reverse path through the housings 125 outputs 129 and inputs 128 to be recuperated and redirected to the concentrate holding tank using valve 136. The compressed air inlet 138 may be provided with a pressure regulator 126 to control the air pressure into the housings 125.

Figure 5:
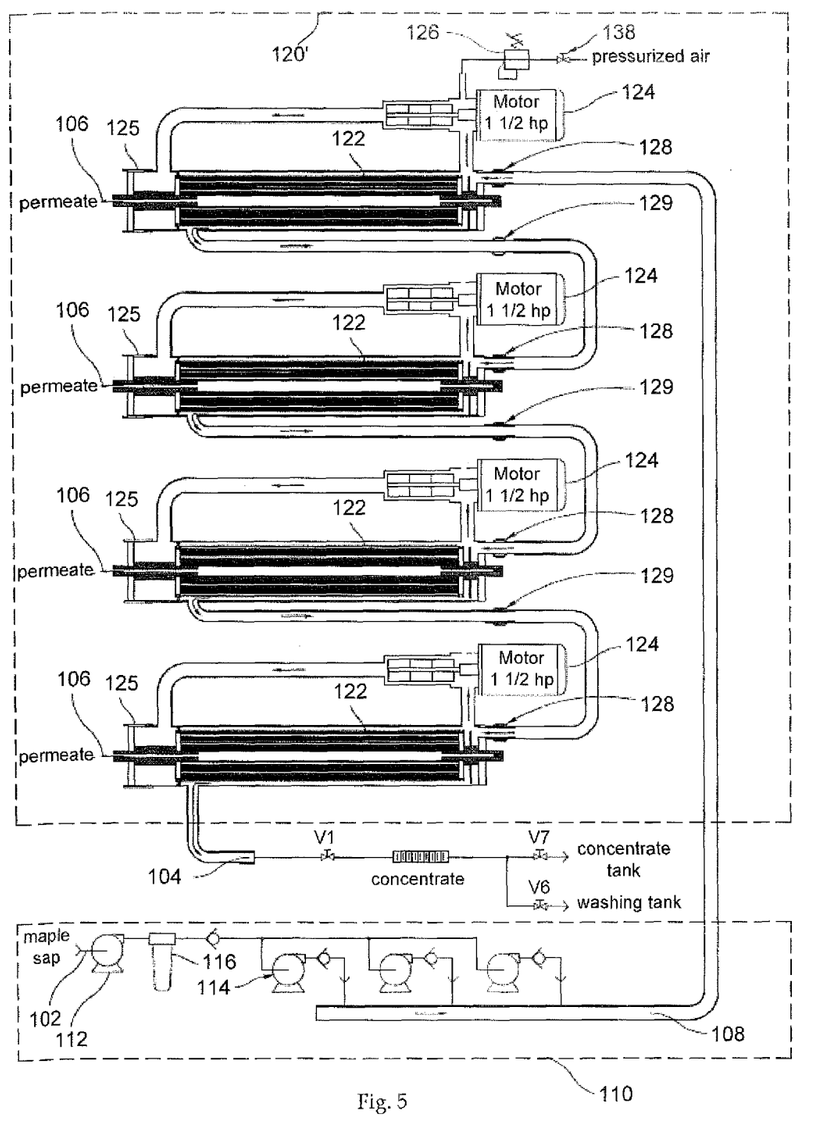
FIG. 5 is detailed view of a second example of a membrane sub-system in accordance with an illustrative embodiment of the present disclosure.

Referring to FIG. 5, there is shown a second detailed example of a membrane sub-system 120' in accordance with the general configuration of the membrane sub-system 120' of FIG. 2. In this example, the positioning of the housings 125 inputs 128 and outputs 129 have been inversed, i.e. the input 128 is located on a top portion of the housing 125 while the output 129 is located on a bottom portion of the housing. This allows the use of valves V1 combined with valve V7 to recuperate concentrate in the concentrate holding tank or with valve V6 to redirect liquids to the washing tank for draining (see also FIG. 2).

Figure 6:
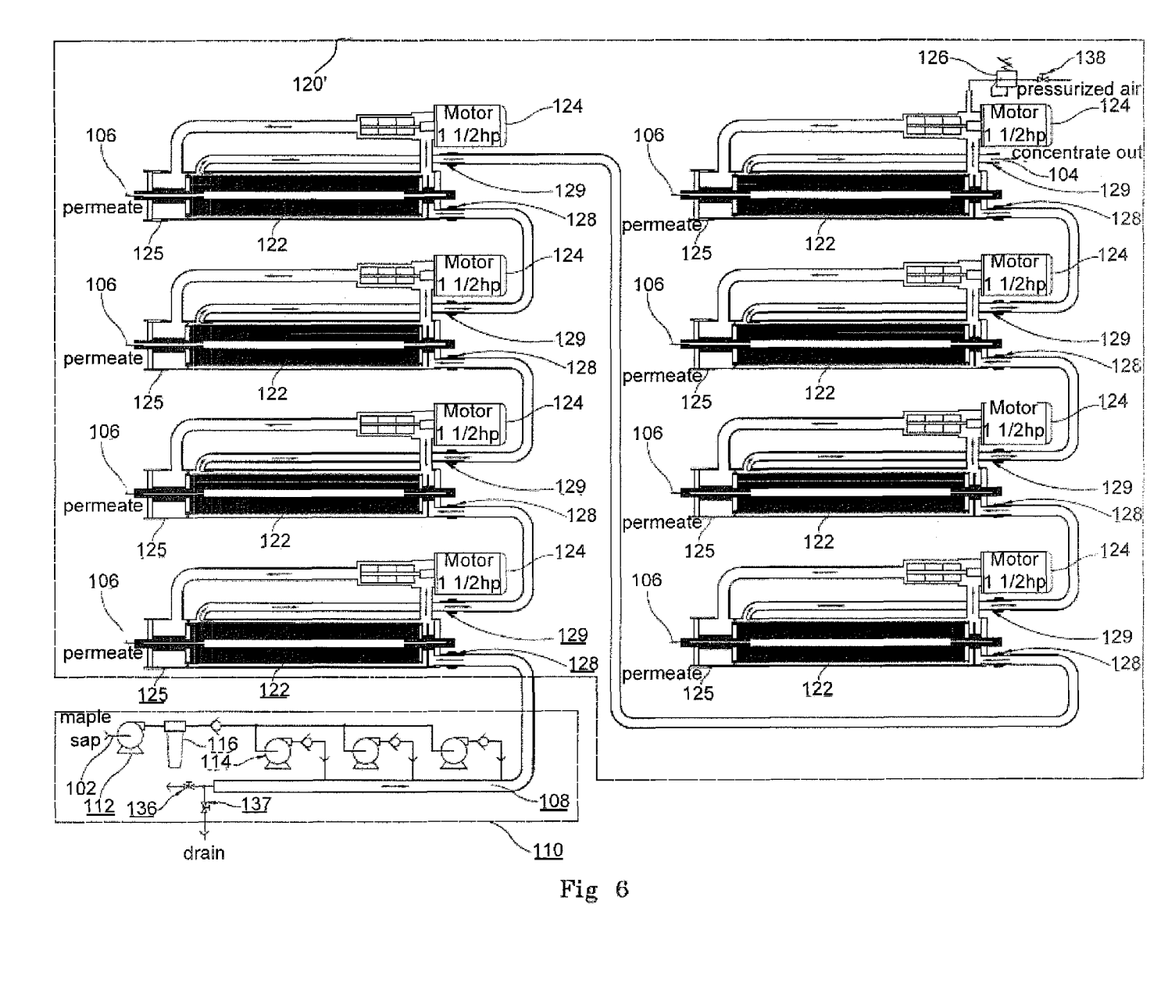
FIG. 6 is detailed view of a third example of a membrane sub-system in accordance with an illustrative embodiment of the present disclosure.

Referring to FIG. 6, there is shown a third detailed example of a membrane sub-system 120' in accordance with the general configuration of the membrane sub-system 120' of FIG. 2. In this example, the configuration of the membrane sub-system 120' is similar to that of membrane sub-system 120' of FIG. 4 scaled to include eight housings 125 with associated recirculation pumps 124. It is to be understood that the number of housings 125 and associated recirculation pumps 124 may vary as required. Furthermore, because the membrane sub-system 120' uses compressed air or vacuum, the various housings need not be stacked and may be disposed in side by side banks, e.g. two banks of four in the illustrated example, by connecting the output 129 of each topmost housing 125 to the input 128 of the bottommost housing 125 of the next bank.

Figure 7:
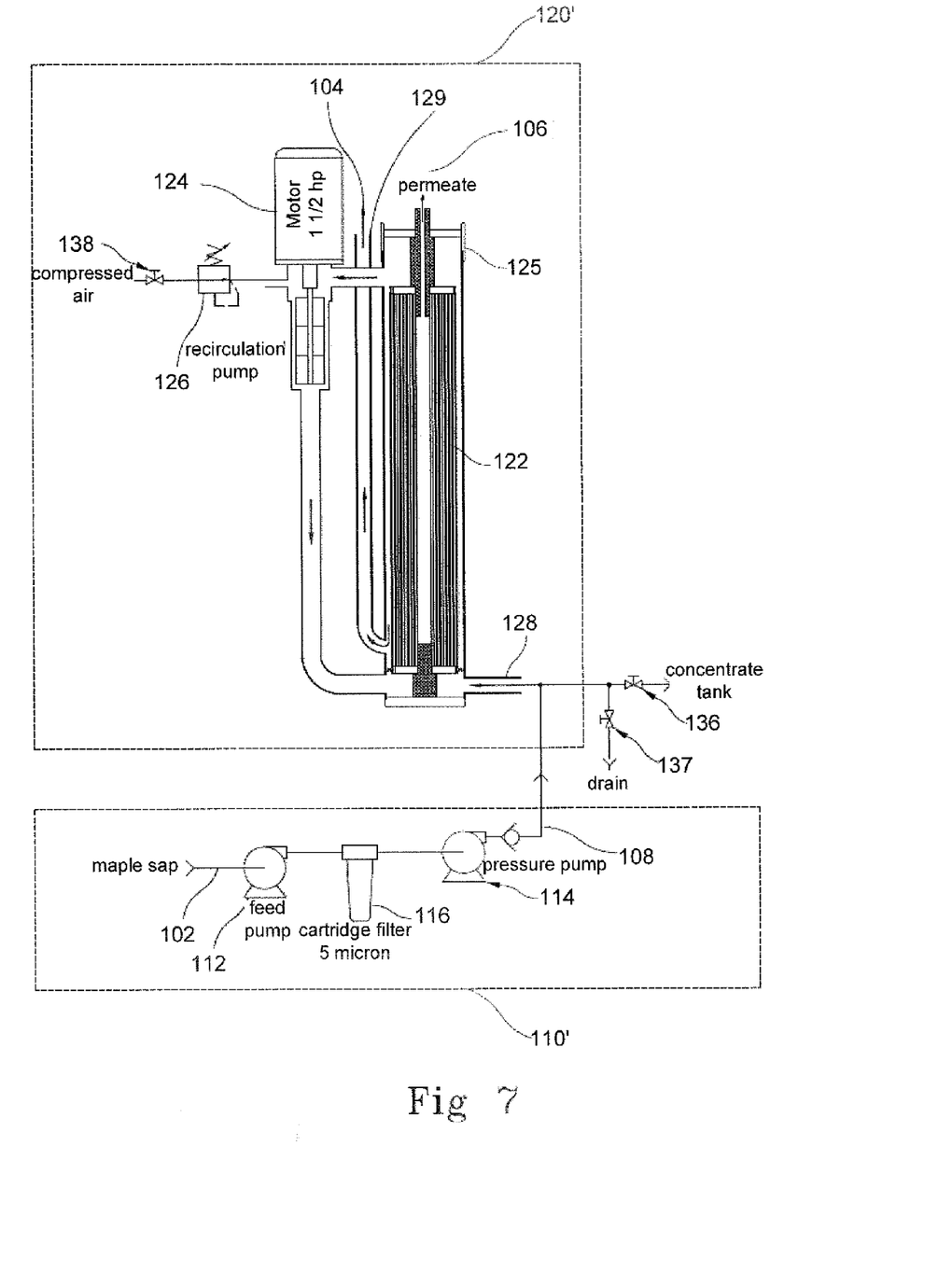
FIG. 7 is detailed view of a fourth example of a membrane sub-system in accordance with an illustrative embodiment of the present disclosure.

Referring now to FIG. 7, there is shown a fourth detailed example of a membrane sub-system 120' in accordance with the general configuration of the membrane sub-system 120' of FIG. 2. In this example, the configuration of the membrane sub-system 120' includes a generally vertical housing 125 with its input 128 placed at a bottom end and the other components placed similarly as with the previously described membrane sub-system 120' (see FIG. 4). It is to be understood, however, that the membrane sub-system 120' may comprise a plurality of generally vertical housings 125.

It should be noted that in the above configurations, an oil-less air compressor should be used with compressed air inlet 138 in order not to contaminate the osmosis membranes 122 within the housings 125. Alternatively, an air filter eliminating any traces of oil vapor may be used with an oil based compressor.

It is to be understood that although the above alternative configurations have been described with reference to membrane sub-system 120', these also apply to membrane sub-system 120 using a vacuum system instead of compressed air.

With regard to the configuration of the membrane sub-system 120 of FIGS. 1 and 3, the draining may be accomplished by connecting a vacuum system commonly used by maple grove operators to collect sap from maple trees to conduit 108. In this configuration, a vacuum regulator 150 is used to protect the osmosis membranes 122 which, typically, required the pressure to remain below 5 psi. Alternatively, a water pump connected to conduit 108 may be used to extract the concentrate still in the housings 125 and to redirect it at the output of the pump to the concentrate holding tank 144.

Figure 8:
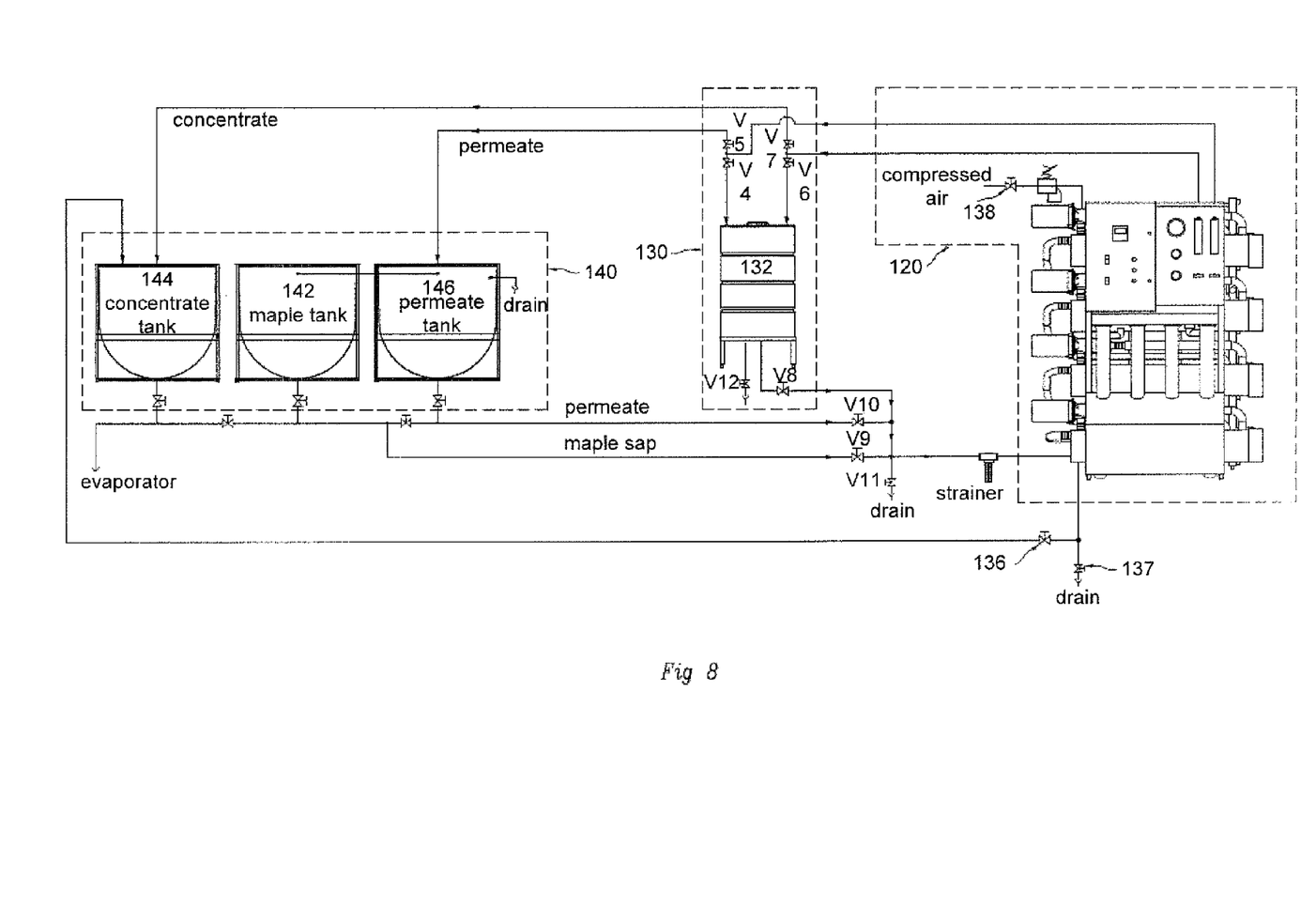
FIG. 8 is a schematic representation of the maple sap reverse osmosis system of FIG. 2 further showing the storage sub-system.

Referring now to FIG. 8, there is shown the connections between the washing sub-unit 130 and the membrane sub-system 120' of FIG. 2 to a tank sub-system 140 comprising a concentrate holding tank 144, a maple sap holding tank 142 and a permeate holding tank 146. It should be noted that the pumping sub-system is not shown in this figure.

Figure 9:
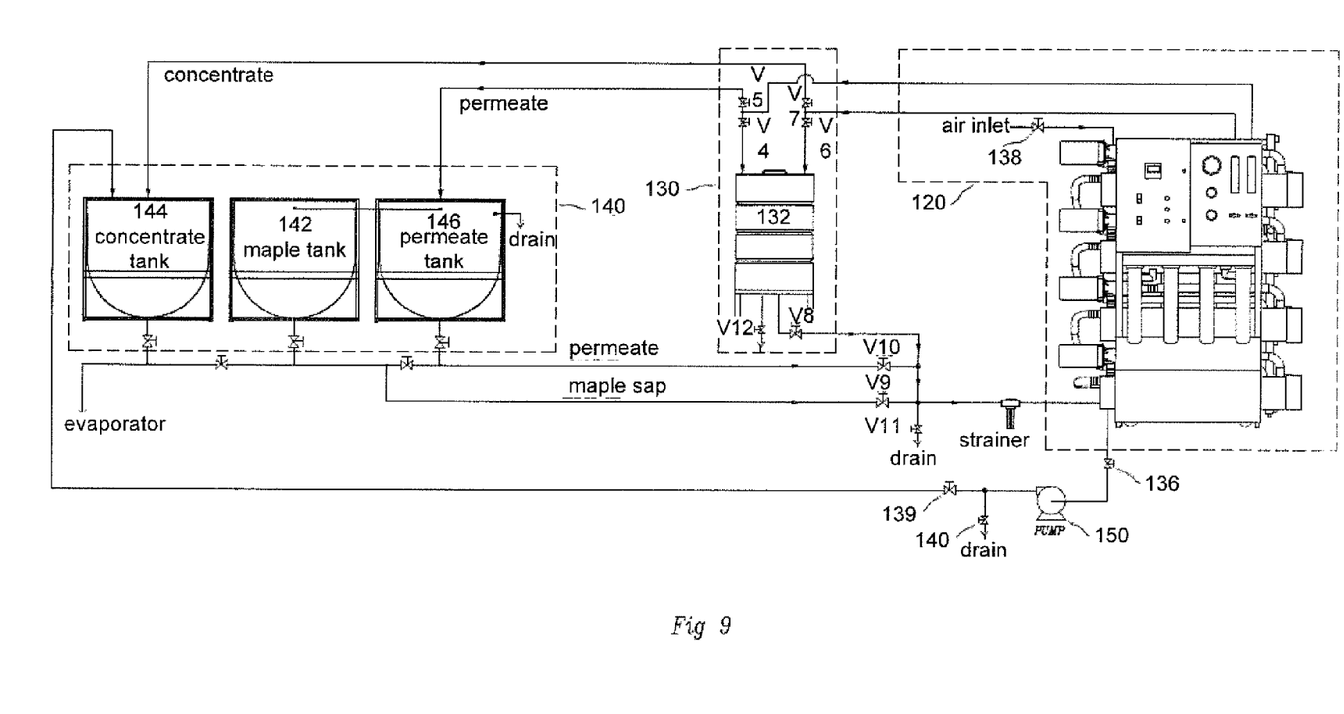
FIG. 9 is a schematic representation of the maple sap reverse osmosis system of FIG. 1 or 3 further showing the storage sub-system.

FIG. 9 shows the connections between the washing sub-unit 130 and the membrane sub-system 120 of FIGS. 1 and 3 to a tank sub-system 140 comprising a concentrate holding tank 144, a maple sap holding tank 142 and a permeate holding tank 146. It should be noted that the pumping sub-system is not shown in this figure.

In conventional systems, concentrate is recuperated by injecting permeate into the membrane sub-system in order to push the concentrate out of the housings. This has the disadvantage that of diluting the concentrate (e.g. from 15'brix down to 2'brix) thus adding pure water into the concentrate holding tank. At some point the operator simply redirects the concentrate/permeate mixture to the drain in order to limit the addition of pure water into the concentrate holding tank. This results in concentrate waste. However, the use of compressed air, vacuum or a water pump as provided with the present membrane sub-system 120, 120' allows for the complete recuperation of the concentrate still present in the housings 125 at the end of each day, e.g. 160 liters at 15'brix, compared to about 800 liters at 4'brix with the conventional method.

Further to the recuperation of concentrate, the present membrane sub-system 120, 120' also provides for the evacuation of the washing solution from the housings 125 after a cleaning cycle, which accelerates the process and greatly reduces the amount of permeate required for rinsing.

Once the membrane sub-system 120, 120' has been properly rinsed with permeate and then drained, as described above, the reverse osmosis system 100, 100', 100" can be restarted easily with a concentrate quickly attaining 15'brix as the housings 125 are free of permeate that affect the concentration of the sap entering the system at startup. This is a great advantage as the evaporation of the concentrate is a costly operation and any added permeate adds greatly to the cost.

A further advantage of the present membrane sub-system 120, 120' is that the complete draining of all liquid from the individual housings 125 allows the reverse osmosis system 100, 100', 100" to be located in an unheated location.

It is further to be understood that the feed pump and filter bank set redundant configuration of the pumping sub-system 110' may also be used with reverse osmosis systems other than the above described reverse osmosis systems 100 and 100'.

Although the present disclosure has been described by way of particular embodiments and examples thereof, it should be noted that it will be apparent to persons skilled in the art that modifications may be applied to the present particular embodiments without departing from the scope of the present disclosure.

The invention claimed is:

1. A maple sap reverse osmosis system comprising:
   a feed pressure pump configured for receiving maple tree sap;
   a filter bank;
   at least one pressure pump operatively connected to the feed pressure pump through the filter bank;
   a plurality of recirculation pumps operatively connected to the at least one pressure pump, each recirculation pump having a housing having an input positioned at a bottom portion of the housing, a permeate output and a concentrate output, the housing of each recirculation pump enclosing a membrane producing permeate and concentrate from the maple sap, the housings of the plurality of pressure pumps being serially connected, from an entrance position housing to an exit position housing, through associated inputs and concentrate outputs; and
   an air inlet operatively connected to the exit position housing;
   wherein the housings of the plurality of pressure pumps can be completely drained of liquid through the input of the entrance position housing.

2. The maple sap reverse osmosis system of claim 1, further comprising a vacuum regulator operatively connected to the input of the entrance position housing, wherein the air inlet includes a check-valve air inlet and wherein maple tree sap may be recuperated by connecting a vacuum system to the input of the entrance position housing, the vacuum regulator being selected so as to keep the pressure in the membranes to a safe level.

3. The maple sap reverse osmosis system of claim 1, wherein the air inlet includes a pressure regulator and an associated compressed air inlet and wherein maple tree sap may be recuperated at the input of the entrance position housing by injecting compressed air through the compressed air inlet.

4. The maple sap reverse osmosis system of claim 1, wherein the membrane is selected from a group consisting of an osmosis membrane and a nanofiltration membrane.

5. The maple sap reverse osmosis system of claim 1, wherein the housings are stacked vertically, the entrance position being a bottom-most position and the exit position being a top-most position.

6. The maple sap reverse osmosis system of claim 1, wherein the housings are stacked horizontally, the entrance position being a first extremity and the exit position being an opposite extremity.

7. The maple sap reverse osmosis system of claim 1, comprising a plurality of filter banks and a set of path selectors operatively connected between the feed pressure pump and the plurality of filter banks, the path selectors being configured to provide maple tree sap to selected filter banks.

8. The maple sap reverse osmosis system of claim 1, comprising a plurality of feed pressure pumps having associated filter banks and a set of path selectors operatively connected between the feed pressure pumps and a source of maple tree sap, the path selectors being configured to provide maple tree sap to selected feed pressure pumps.

9. A maple sap reverse osmosis system comprising:
   a feed pressure pump configured for receiving maple tree sap;
   a filter bank;
   at least one pressure pump operatively connected to the feed pressure pump through the filter bank;
   a plurality of recirculation pumps operatively connected to the at least one pressure pump, each recirculation pump having a housing having an input, a permeate output and a concentrate output positioned at a bottom portion of the housing, the housing of each recirculation pump enclosing a membrane producing permeate and concentrate from the maple sap, the housings of the plurality of pressure pumps being serially connected, from an entrance position housing to an exit position housing, through associated inputs and concentrate outputs; and
   an air inlet operatively connected to the entrance position housing;
   wherein the housings of the plurality of pressure pumps can be completely drained of liquid through the concentrate output of the exit position housing.

10. The maple sap reverse osmosis system of claim 9, further comprising a vacuum regulator operatively connected to the concentrate output of the exit position housing, wherein the air inlet includes a check-valve air inlet and wherein maple tree sap may be recuperated by connecting a vacuum system to the concentrate output of the exit position housing, the vacuum regulator being selected so as to keep the pressure in the membranes to a safe level.

11. The maple sap reverse osmosis system of claim 9, wherein the air inlet includes a pressure regulator and an associated compressed air inlet and wherein maple tree sap may be recuperated at the concentrate output of the exit position housing by injecting compressed air through the compressed air inlet.

12. The maple sap reverse osmosis system of claim 9, wherein the membrane is selected from a group consisting of an osmosis membrane and a nanofiltration membrane.

13. The maple sap reverse osmosis system of claim 9, wherein the housings are stacked vertically, the entrance position being a top-most position and the exit position being a bottom-most position.

14. The maple sap reverse osmosis system of claim 9, wherein the housings are stacked horizontally, the entrance position being a first extremity and the exit position being an opposite extremity.

15. The maple sap reverse osmosis system of claim 9, comprising a plurality of filter banks and a set of path selectors operatively connected between the feed pressure pumps and the plurality of filter banks, the path selectors being configured to provide maple tree sap to selected filter banks.

16. The maple sap reverse osmosis system of claim 9, comprising a plurality of feed pressure pumps having associated filter banks and a set of path selectors operatively connected between the feed pressure pumps and a source of maple tree sap, the path selectors being configured to provide maple tree sap to selected feed pressure pumps.

17. A maple sap reverse osmosis system comprising:
   a feed pressure pump configured for receiving maple tree sap;
   a plurality of filter banks;

a set of path selectors being configured to provide maple tree sap to selected filter banks;

at least one pressure pump operatively connected to the feed pressure pump through the filter banks;

a plurality of recirculation pumps operatively connected to the at least one pressure pump, each recirculation pump having a housing having an input, a permeate output and a concentrate output, the housing of each recirculation pump enclosing a membrane producing permeate and concentrate from the maple sap, the housings of the plurality of pressure pumps being serially connected, from an entrance position housing to an exit position housing, through associated inputs and concentrate outputs; and an air inlet operatively connected to the entrance position housing; wherein the housings of the plurality of pressure pumps can be completely drained of liquid through the concentrate output of the exit position housing.

18. The maple sap reverse osmosis system of claim 17, comprising a plurality of feed pressure pumps, one feed pressure pump being associated with each filter bank, wherein the path selectors are operatively connected between the feed pressure pumps and a source of maple tree sap.

* * * * *